US009258287B2

(12) United States Patent
Markel et al.

(10) Patent No.: US 9,258,287 B2
(45) Date of Patent: Feb. 9, 2016

(54) SECURE ACTIVE NETWORKS (71) Applicant: Broadcom Corporation, Irvine, CA (US)

(72) Inventors: Shlomo Markel, Haifa (IL); Jacob Mendel, Brenner (IL)

(73) Assignee: Broadcom Corporation, Irvine, CA (US)

( * ) Notice: Subject to any disclaimer, the term of this patent is extended or adjusted under 35 U.S.C. 154(b) by 46 days.

(21) Appl. No.: 13/723,036

(22) Filed: Dec. 20, 2012

(65) Prior Publication Data

US 2014/0181901 A1    Jun. 26, 2014

(51) Int. Cl.
*G06F 7/04* (2006.01)
*H04L 29/06* (2006.01)
*H04W 12/12* (2009.01)

(52) U.S. Cl.
CPC .............. *H04L 63/08* (2013.01); *H04L 29/06* (2013.01); *H04L 63/1425* (2013.01); *H04W 12/12* (2013.01)

(58) Field of Classification Search
CPC ....... H04L 63/08; H04L 63/10; H04W 12/06; G06F 21/31
See application file for complete search history.

(56) References Cited

U.S. PATENT DOCUMENTS

| | | | |
|---|---|---|---|
| 7,299,503 B2 * | 11/2007 | Ballard ........................... | 726/29 |
| 7,996,680 B2 * | 8/2011 | Kalibjian et al. ............. | 713/176 |
| 8,755,331 B2 * | 6/2014 | Boland et al. ................. | 370/328 |
| 8,788,805 B2 * | 7/2014 | Herne et al. .................. | 713/153 |
| 8,806,653 B2 * | 8/2014 | Di Rienzo ....................... | 726/27 |
| 2002/0029335 A1 * | 3/2002 | Crockett et al. .............. | 713/151 |
| 2003/0217151 A1 * | 11/2003 | Roese et al. ................. | 709/225 |
| 2007/0168534 A1 * | 7/2007 | Hiltunen et al. ............. | 709/230 |
| 2009/0172171 A1 * | 7/2009 | Amir ............................. | 709/227 |
| 2010/0166007 A1 * | 7/2010 | Horner .......................... | 370/458 |
| 2010/0274855 A1 * | 10/2010 | Wassingbo .................... | 709/206 |
| 2012/0026988 A1 * | 2/2012 | Husted et al. ................. | 370/336 |

* cited by examiner

*Primary Examiner* — Fikremariam A Yalew
(74) *Attorney, Agent, or Firm* — Sterne, Kessler, Goldstein & Fox P.L.L.C.

(57) ABSTRACT

A secure active network includes a plurality of secure elements which communicate with one another to share and log information such as identification, location, and user activity associated with each secure element. Secure elements exchange data with one another, and log data received. The periodicity of communication between secure elements, encryption of the information, and the operating frequency in which the information is transmitted and received may be changed if communication is lost between any of the secure elements or if a determination is made that a secure element has traveled outside a predetermined zone. The integrity of the secure network may be verified at any time by comparing the logged information to a reference network.

20 Claims, 9 Drawing Sheets

REFERENCE NETWORK A

| SECURE ELEMENT 106 | t1 | DATA 102 | |
| | t1 | DATA 104 | LOCATION 1-4 |
| | t1 | DATA 108 | |
| | t1 + 10 | DATA 102 | |
| | t1 + 10 | DATA 104 | LOCATION 1-4 |
| | t1 + 10 | DATA 108 | |
| | t1 + 20 | DATA 102 | |
| | t1 + 20 | DATA 104 | LOCATION 1-4 |
| | t1 + 20 | DATA 108 | |

THRESHOLD NUMBER OF COMUNICATION ERRORS = 3

RECONSTRUCTED NETWORK A

| SECURE ELEMENT 106 | 13:03 | DATA 102 | |
| | 13:03 | DATA 104 | LOCATION 1 |
| | 13:03 | DATA 108 | |
| | 13:13 | <NO DATA> | |
| | 13:13 | DATA 104 | LOCATION 1 |
| | 13:13 | DATA 108 | |
| | 13:23 | DATA 102 | |
| | 13:23 | DATA 104 | LOCATION 5 |
| | 13:23 | DATA 108 | |

| SECURE ELEMENT 102 | 13:03 | DATA 104 | LOCATION 1 |
| | 13:03 | <NO DATA> | |
| | 13:13 | DATA 104 | LOCATION 1 |
| | 13:13 | <NO DATA> | |
| | 13:23 | DATA 104 | LOCATION 5 |
| | 13:23 | <NO DATA> | |

| SECURE ELEMENT 104 | 13:03 | DATA 102 | |
| LOCATION 1 | 13:03 | DATA 106 | |
| | 13:13 | <NO DATA> | |
| | 13:13 | DATA 106 | |
| | 13:23 | DATA 102 | |
| | 13:23 | DATA 106 | |

SECURE ACTIVE NETWORKS

FIELD OF DISCLOSURE

The present disclosure relates generally to networks and specifically to active network security.

BACKGROUND

Active network systems are often implemented to enable networked elements which are part of the active network to respond to perceived security threats.

While the networked elements may communicate with one another to determine rudimentary information such as general operating status, the devices coupled to the networked elements, such as consumer goods, for example, may be the target of theft, replacement by a forgery, and/or unauthorized use. Such malicious acts may go unnoticed in a standard networked system, since the network is not capable of determining the difference between a missing or unauthorized device and a device which is powered off or temporarily disconnected from the network.

Furthermore, networked devices may be left for long periods of time in an unsecure environment, such as in a warehouse or a shipping container. Because of this, these devices are susceptible to theft whereby the physical outer packaging of the device is left intact. At a glance, the packaging of the device may appear to be secure, but the packaging could in actuality be empty or the original device replaced with a counterfeit device. In such a situation, long periods of time may elapse whereby the integrity of the original devices is unknown. Due to the fact that the devices are not actively monitored, the owner or manufacturer of the devices may not realize that the devices have been stolen, replaced, or removed from the network, until long after the devices have already been removed.

What is needed, therefore, is a network architecture which may verify the integrity of the networked devices by monitoring a log of communication between the devices, dynamically changing the properties of the network if network integrity is compromised, and alerting the other devices and/or the owner of the devices to a loss of integrity of any device.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

Figure 1:
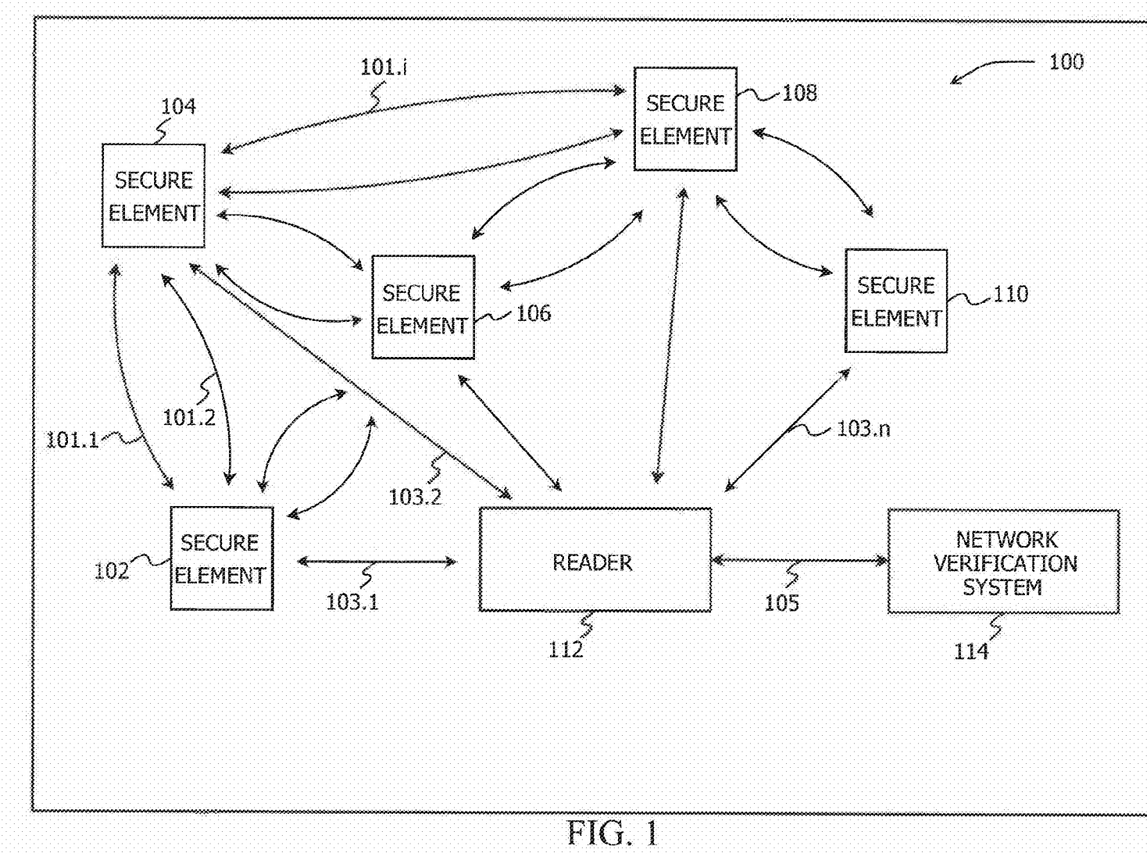
FIG. 1 illustrates a block diagram of a secure active network according to an exemplary embodiment of the disclosure.

FIG. 1 illustrates a block diagram of a secure active network according to an exemplary embodiment of the disclosure. Secure active network 100 includes secure elements 102, 104, 106, 108, and 110, reader 112, and network verification system 114. As would be appreciated by a person having ordinary skill in the art, secure active network 100 may include any number of secure elements.

In embodiments, a secure element is configured to be attached to an item or a device. For example, a secure element may be coupled to a device such as a computer or may be coupled to a pallet containing multiple items or devices. In addition, or alternatively, a secure element may be integrated into a device.

Secure elements 102, 104, 106, 108, and 110 communicate with one or more other secure elements via communication links, such as communication links 101.1 through 101.i. For example, secure element 104 communicates with secure elements 102 and 106, whereas secure element 110 only communicates with secure element 108. In this manner, an ad hoc or mesh network is created. In a wireless embodiment, the location of secure elements may vary over time. In these embodiments, a secure element may communicate with additional or different secure elements during the time period. Communication links 101.1 through 101.i. may be wired or wireless connections. Although secure elements 102, 104, 106, 108, and 110 are illustrated in FIG. 1 as communicating directly with one another as indicated by the two-way arrows, secure elements 102, 104, 106, 108, and 110 may also communicate with one another indirectly, utilizing a network hub, for example (not shown). A network hub may facilitate communication between secure elements 102, 104, 106, 108, and 110 and/or provide a common point of connection such that the secure elements 102, 104, 106, 108, and 110 need not be in wireless communications range of one another to communicate.

In an embodiment of the present disclosure, a secure element participates in communications sessions with one or more other secure elements according to a communications schedule. The schedule may set forth the timing of communication. For example, communications sessions may be separated by intervals of no communications. A secure element may encrypt some or a portion of the data prior to transmission to a communication partner.

A secure element stores identification information which uniquely identifies the secure element within the network. In an embodiments, the serial number of a device or item coupled to the secure element 102 is used as the identification information. In these embodiments, the serial number may be represented as a bitstring which is masked within a predetermined length of randomly generated data. In this way, if someone receives, or "snoops" data communicated and exchanged between secure elements, the serial number may not be easily discerned without knowledge of the predetermined lengths. For example, Equation (1) below provides a representation of a bitstring that may be communicated and logged between two secure elements:

$$[\text{Random}(x)][\text{Serial Number}(m)][\text{Customer Data}(y)][\text{Random}(z)] \quad (1)$$

Equation (1) provides four data fields, the variables x, m, y, and z being indicative of bit lengths of each respective data field. The serial number may be a fixed length less than m, with the least significant or most significant remaining portion of the serial number data field being padded with ones or zeroes to fill the remaining bits of the overall bit length m. Similarly, the customer data field may be any bit length y, which may include manufacturer information such as a factory manufacturing code or country code, for example, or any other information, with the remaining bit length padded accordingly. The random data fields are of length x and z, which may be the same or different lengths, and are filled with randomly generated bits at each of the secure elements 102, 104, 106, 108 and 100 during production, for example.

Using equation (1) to communicate and log data within secure elements 102 and 104 provides added security within secure active network 100. If an unauthorized user obtains the bitstring represented by Equation (1), the serial number may not be easily deciphered without knowledge of the mask which includes the appropriate lengths x, m, y, and z.

Secure elements 102, 104, 106, 108, and 110 are configured to transmit data to other secure elements. The data includes, for example, the identifier of the secure element and a set of communication and/or location information. The location information can include data representative of a physical location of the secure element. The secure element stores all or a portion of the data received from its communication partners in one or more logs. The data log may also contain a timestamp indicating when the communications occurred and whether the communications between the secure element and its communication partner was successful.

The data log comprises data received from each communication partner of the secure element for every scheduled communications session. Additionally, the data log may include some or a portion of the data transmitted to each communication partner. During communication sessions, a secure element may also store location data representative of a physical location of the secure element and/or location data received from its communication partners. All or a portion of the data log may be stored in encrypted form. Secure element logs are described in further detail below.

Reader 112 is configured to communicate with secure elements 102, 104, 106, 108, and 110 via communication links 103.1 through 103.$n$, and to communicate with network verification system 114 via communication link 105. Reader 112 may be configured to communicate with secure elements using unencrypted or encrypted communications. Communication links 103.1 through 103.$n$ and communication link 105 may be wired or wireless connections. Reader 112 may be a near field communication device (e.g., an RFID reader) or may communicate via wireless or wired protocols. Reader 112 is configured to transmit data, such as instructions, controls, and/or commands, for example, to the secure elements. Reader 112 is configured to receive data from secure elements 102, 104, 106, 108, and 110, including the logged data, and transmit this data to network verification system 114. In embodiments, reader 112 is optional. In these embodiments, the functionality to communicate with secure elements is incorporated within network verification system 114.

Network verification system 114 is configured to communicate with reader 112 to process the data received from the secure elements. In an embodiment of the present disclosure, network verification system 114 receives logged data from secure elements 102, 104, 106, 108, and 110. Network verification system 114 then processes the logged data to reconstruct secure active network 100 over a period of time by analyzing the history of communications sessions associated with each of the secure elements 102, 104, 106, 108, and 110.

Network verification system 114 is configured to store one or more reference secure network profiles. A reference secure network profile may include information specifying the configuration of the secure network over a period of time. For example, reference secure network profile may specify the secure element communications map for the network including the communications pairs within the network. The reference secure network profile may also the communications schedule for each secure profile as well as an expected location profile for each secure element over a period of time. By comparing the reconstructed network to the reference secure network profile, network verification system 114 may determine whether any of the secure elements have been compromised.

Figure 2:
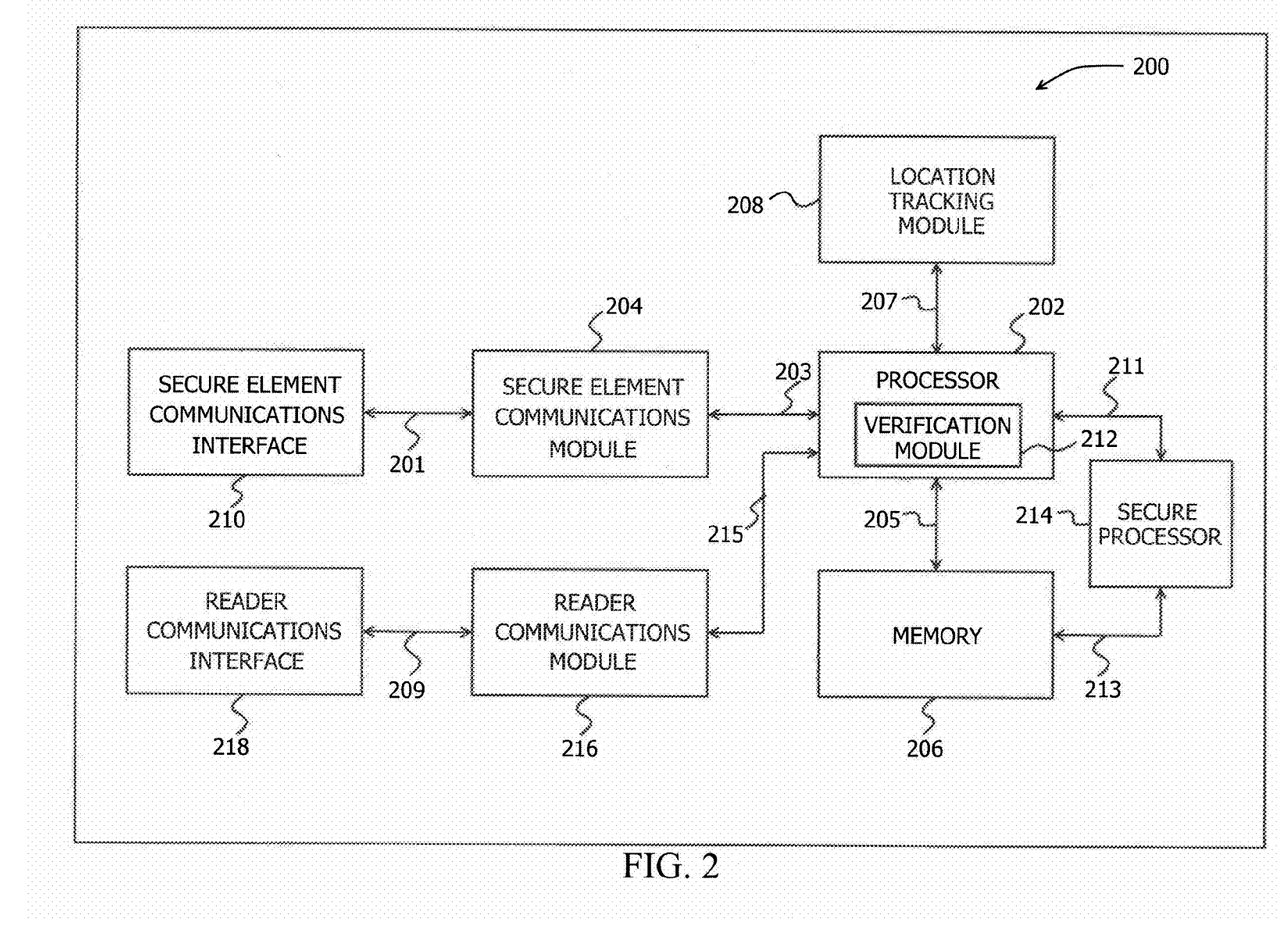
FIG. 2 illustrates a secure element according to an exemplary embodiment of the disclosure.

FIG. 2 illustrates an exemplary secure element 200 of FIG. 1, according to an exemplary embodiment of the disclosure. Secure element 200 includes processor 202, verification module 212, secure element communications module 204, secure element communications interface 210, and memory 206. Secure element 200 may be implemented as part of a CPU, chipset, integrated circuit (IC), application specific integrated circuit (ASIC), or as a standalone component.

Processor 202 is coupled to secure element communications module 204 and memory 206 via communications links 203 and 205, respectively. Communications links 203 and 205 may be communication buses. Processor 202 is configured to control other components of the secure element including secure element communications module 204 and memory 206. Processor 202 may be implemented using hardware, software, and/or logic configured to communicate and control components of the secure element.

In an embodiment of the present disclosure, processor 202 determines a network communications map for the secure element. For example, processor 202 determines what secure elements are within communications range of the secure element. Processor 202 stores a list of other secure elements within communications range of secure element 200 in memory 206. The list may include an identification number associated with each secure element. Thereafter, processor 202 instructs secure element communications module 204 to initiate communications with the identified secure elements according to a communications schedule.

Secure element 200 may include a location tracking module 208. Because location data may propagate throughout all secure elements of a secure active network, each secure element in the network may not require a location tracking module 208. Location tracking module 208 is configured to determine the physical location of secure element 200. The location tracking module may be implemented as a Global Navigation Satellite Signal (GNSS) receiver, for example. In embodiments of the present disclosure where secure element communications module 204 is configured to support cellular protocols, location tracking module 208 may communicate with secure element communications module 204 to utilize assisted GNSS techniques.

Processor 202 may further include verification module 212. Verification module 212, when present, is configured to identify anomalies indicative of a compromise of one or more elements of the ad hoc network. As will be appreciated by those having ordinary skill in the art, verification module 212 may be implemented as software executing within processor 202, or as a standalone processor coupled to processor 202. Verification module 212 analyzes location data and/or logged data to determine whether one or more of its communications partners has been compromised. If a secure element has been compromised, verification module 212 causes the secure element to transmit a data flag to its communication partners.

In accordance with this embodiment, verification module 212 may prioritize identified detected condition. For example, verification module 212 may set a low priority flag if the logged data indicates that communications has been lost between a secure element and one or more of its communication partners for a number of communications sessions. Verification module 212 may set a higher priority flag if the location data received from location tracking module 208 indicates that a secure element has been removed from an allowed zone.

Verification module 212 may correlate a stored communications profile to a data flag. Upon receipt of a data flag, secure element 200 retrieves a communications profile associated with the data flag and makes necessary modifications. For example, the data flag may cause the secure elements to move to encrypted communications, change the frequency of communications, and/or may change the communications schedule.

If a data flag is generated at the secure element 200 or received from one of its communications partners, secure element 200 then transmits the data flag to all of its communication partners. In this way, the data flag propagates through the entire secure active network. Each of secure elements 102, 104, 106, 108, and 110 may be configured to execute the same communication profile according to receipt of the same data flags. Therefore, if any of the secure elements determine that another secure element has been compromised, the entire secure active network dynamically synchronizes to utilize the same communications profile.

Memory 206 is configured to store the data log for the secure element. Memory 206 may be implemented as any number of volatile and/or non-volatile modules or partitions. Although memory 206 is illustrated in FIG. 2 separate from processor 202, those skilled in the art will appreciate that the memory 206 may be integrated with processor 202.

In embodiments of the present disclosure, data stored in memory 206 is encrypted using an encryption key. The same encryption key may be utilized by all secure elements within secure active network 100 during a scheduled communications session. Any number of encryption keys may be written to a non-volatile portion of memory during production, for example.

Memory 206 may be partitioned into secured and unsecured address partitions. The unsecured address partitions may include identification information associated with secure element 200, data log for the secure element, network profile information such as data flags, location data, and/or any data used by verification module 212, such as allowed operation zone data. The secured partition of the memory 206 may include one or more encryption keys and processor 202 may embed an index or address indicative of which encryption key is used for a particular communications session within the data sent to other secure elements. The secured partition of memory 206 may be accessible by secure processor 214 (when present) and/or processor 202.

The secure element may further include a secure processor 214. Secure processor 214 is configured to perform cryptographic operations required by secure element 200. As discussed above, data exchanged between secure elements and/or between secure element 200 and reader 112 may be encrypted. Secure processor 214 is configured to encrypt and decrypt data transmitted and received from secure element 200. Secure processor 214 may change security parameters (e.g., encryption key) according to instructions received from processor 202.

Secure element communications module 204 is coupled to secure element communications interface 210 via communications link 201. Communications link 201 may be a communications bus. Secure element communications module 204 may be implemented with any number of amplifiers, oscillators, drivers, modulators, and/or demodulators, for example, to send and/or receive data to and from another secure element, such as secure element 104. Secure element communications module 204 may modulate and send data provided by processor 202 to another secure element, such as secure element 104. Secure element communications module 204 may receive and demodulate data sent from another secure element, such as secure element 104, to processor 202. Secure element communications module 204 communicates with other secure elements according to a communications protocol.

Secure element communications interface 210 provides a physical layer for secure element to element communication. Secure element communications interface 210 may be implemented with any number of antennas, couplers, and/or wired connectors, for example. Secure element communications interface 210 may be configured to enable both near-field and far-field communications for secure element communications module 204.

In an embodiment, secure element 200 may further include a reader communications module 216 and a reader communications interface 218. The secure element may communicate with a reader, such as reader 112, via a different method than with other secure elements. For example, if reader 112 is an RFID reader, reader communications module 216 and interface 218 will include hardware, software, and/or logic necessary to communicate with reader 112 via an RFID protocol.

Figure 3:
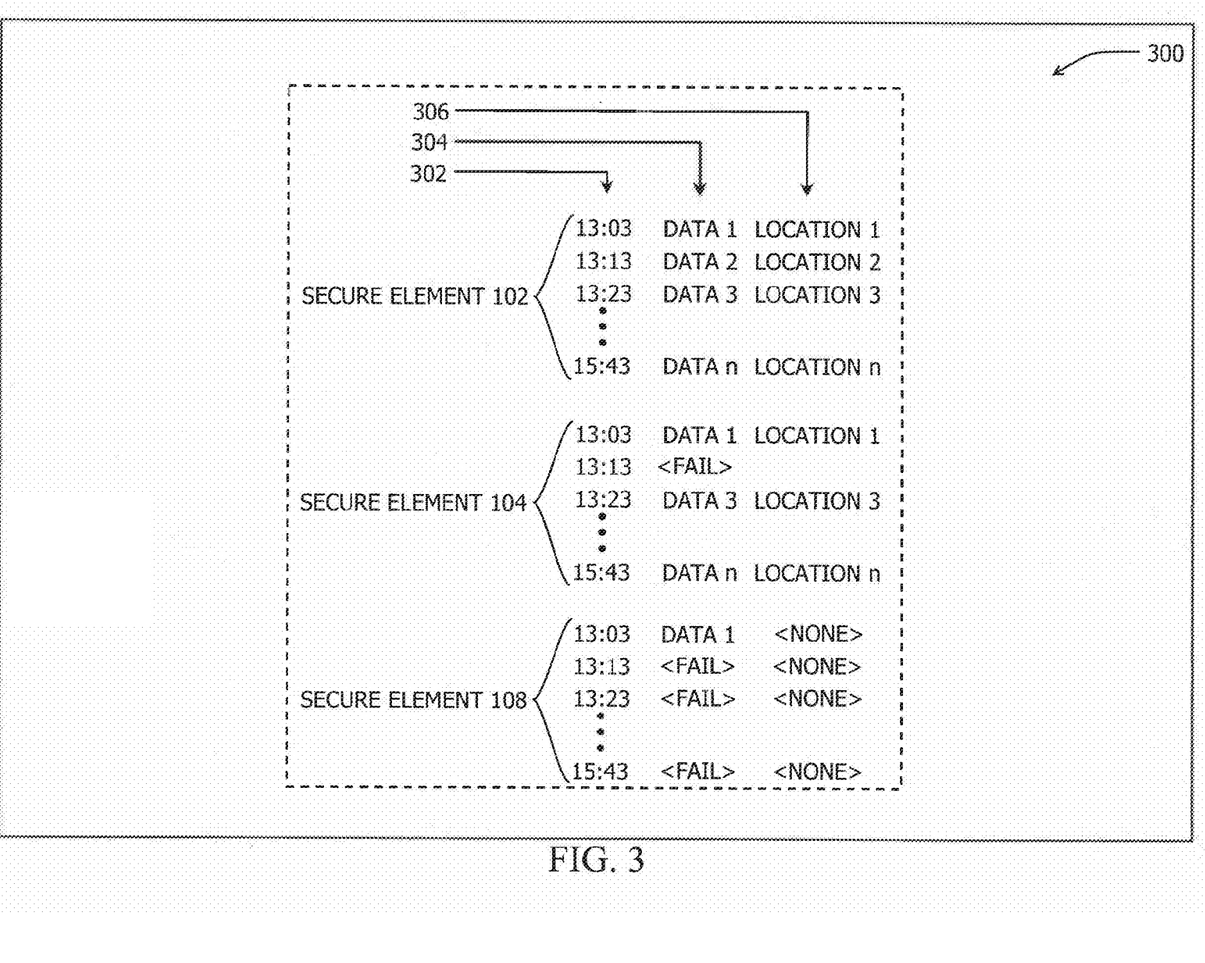
FIG. 3 illustrates an example of a data log stored by a secure network element according to an exemplary embodiment of the disclosure.

FIG. 3 illustrates an example of a data log stored by a secure network element according to an exemplary embodiment of the disclosure. Each entry in the data log 300 includes a timestamp field 302, data field 304, and an optional location field 306.

Upon activation, secure element determines what other secure elements are within communications range of the secure element (referred to as communications partners).

Secure element then logs data received from each of its communications partners. For example, as illustrated in FIG. 3, secure element 106 is in communication with 102, 104 and 108. Although FIG. 3 illustrates each collection of data grouped by individual secure element, data log 300 would ordinarily contain identification information from each of secure elements 104, 104, and 108 to properly identify each group of data entries. In this way, reader 112 may properly parse the groups of data according to each secure element.

Data log 300 includes timestamp field 302 which identifies times of communications (attempted or successful) with its communications partners. As illustrated in FIG. 3, the first communications session for each of secure elements 102, 104, and 108 started at 13:03, and communication was attempted with each of the secure elements 102, 104, and 108 every 10 minutes thereafter.

Data field 304 contains data received from corresponding secure elements 102, 104, and 108. Data field 304 may include communication session information and/or data flags. If communications with any of its communications partner is not successful, data field 304 may include data indicative of the failed communications or may be empty. As illustrated in the example data log 300 shown in FIG. 3, secure element 106 was unable to communicate with secure element 104 at 13:13, but resumed communications at 13:23. Also in accordance with the example data log 300 shown in FIG. 3, secure element 106 communicated with secure element 108 once at 13:03, but then lost communications thereafter.

Location field 306 contains location data received from a communications partner. Depending on whether each of secure elements 102, 104, and 108 are configured with location tracking module 208, location field 306 may or may not include location data. As illustrated in the example data log 300 shown in FIG. 3, secure element 108 is not configured with location tracking module 208, and therefore no location data is received from secure element 108.

Figure 4:
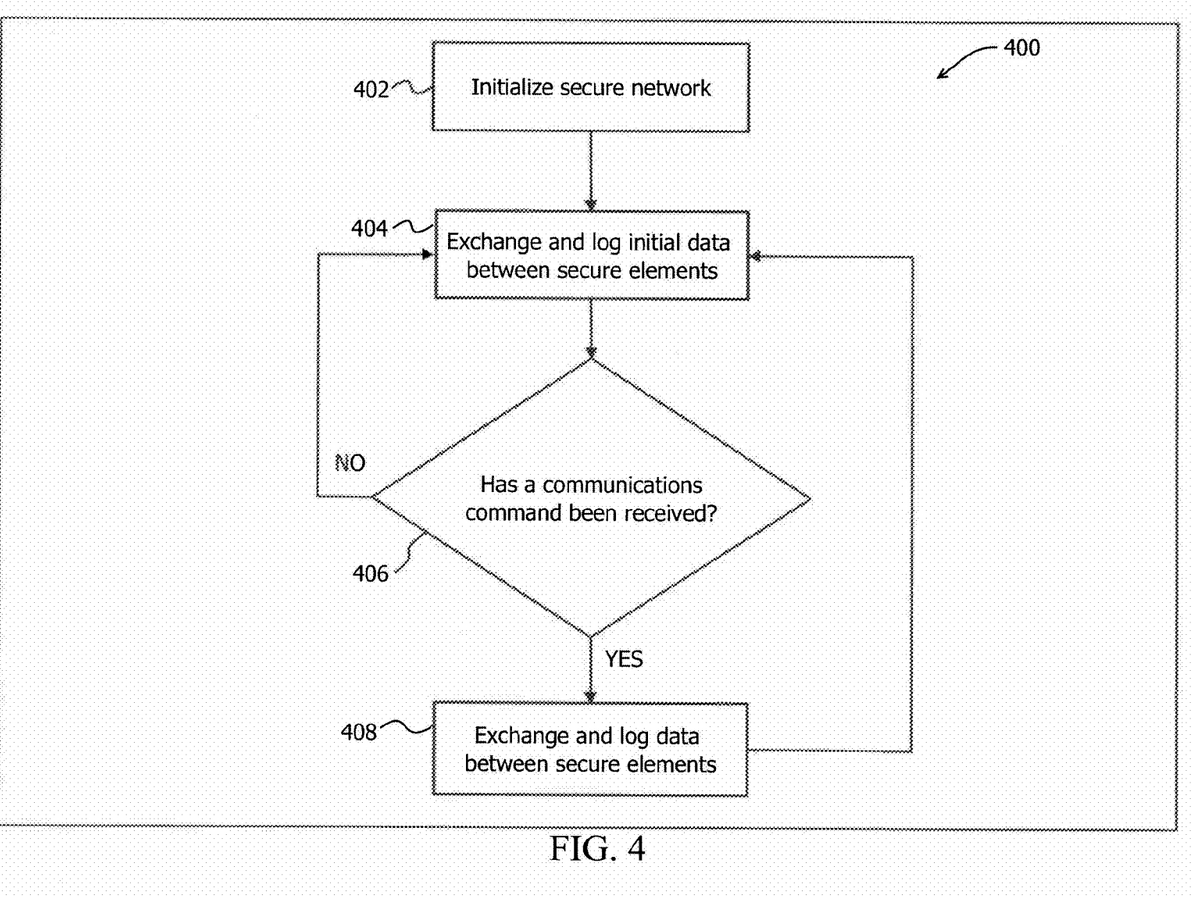
FIG. 4 is a flowchart illustrating a secure element data logging operation according to an exemplary embodiment of the disclosure.

FIG. 4 is a flowchart 400 of a method for data logging at a secure element according to an exemplary embodiment of the disclosure. FIG. 4 is described with continued reference to the embodiments depicted in FIGS. 1-3. However, flowchart 400 is not limited to those embodiments.

In step 402, the secure element determines what other secure elements are within communications range of the secure element. For example, secure element 106 determines that secure elements 102, 104, and 108 are within communications range of secure element 106.

In step 404, the secure element performs a communications session with each of secure elements 102, 104, and 108, and logs data received, in data log 300. Referring back to FIG. 3, a communications session between secure element 106 and secure element 108 occurred at time 13:03.

In step 406, the secure element 106 waits to receive a communications command from processor 202 in accordance with a communications schedule. As illustrated in the example data log 300, processor 202 commands secure element communications module 204 to communicate with secure elements 102, 104, and 108 every to minutes. If no command is received, processing remains at step 406. If a command is received, processing returns to step 404 where secure element 106 communicates with secure elements 102, 104, and 108 to exchange and log data, Referring back to FIG. 3, secure element 106 logs data at time entry 13:13 after receiving a command from processor 202. Once the log entry at 13:13 is written to memory 206, control flow proceeds back to step 404 to await the next communications command from processor 202 corresponding to the next communications session.

Figure 5A:
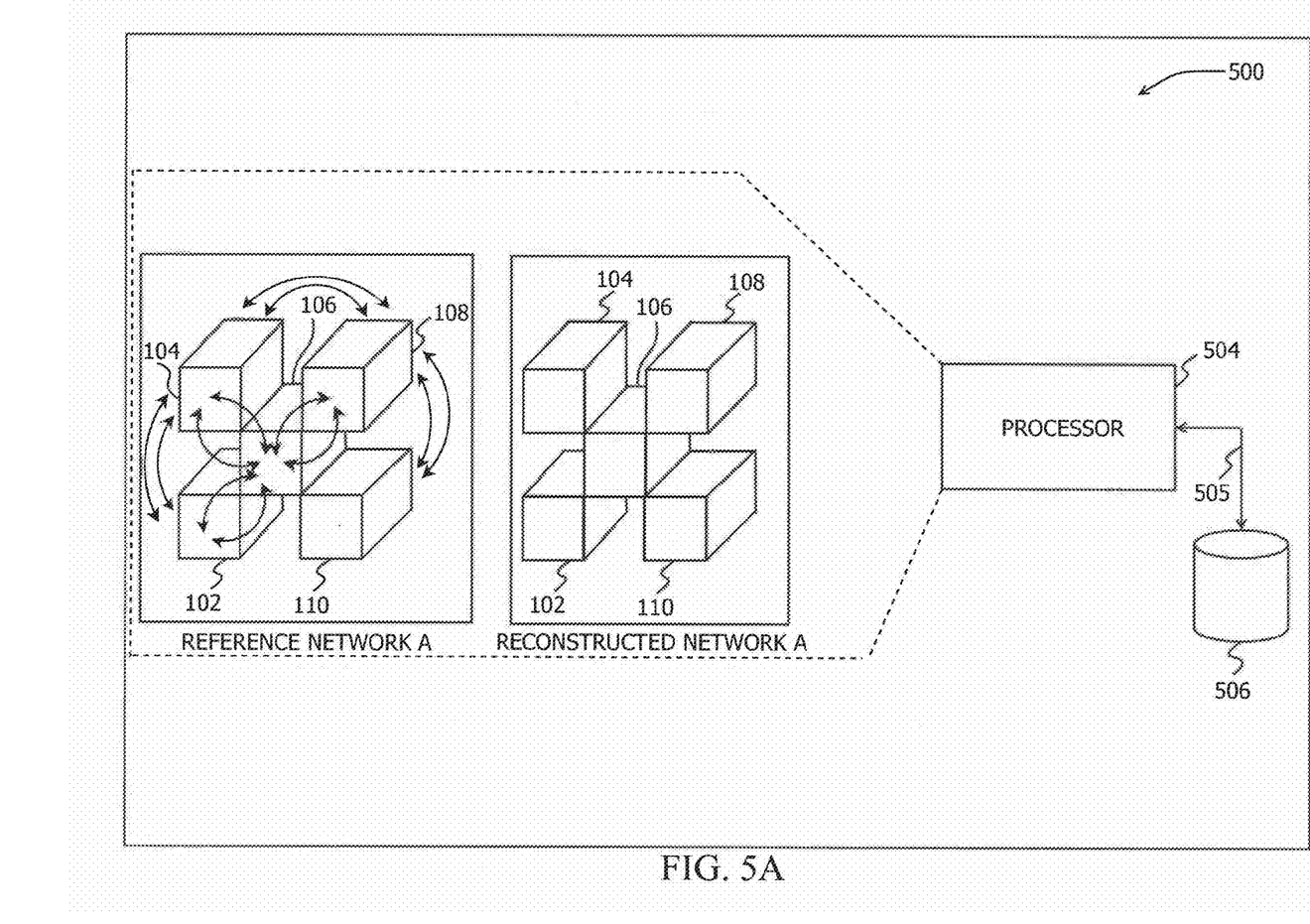
FIG. 5A illustrates a network verification system according to an exemplary embodiment of the disclosure.

FIG. 5A illustrates an exemplary network verification system of FIG. 1, according to an exemplary embodiment of the disclosure. Network verification system 500 includes processor 504 and database 506.

In accordance with an embodiment of the present disclosure, network verification system 500 receives data from a reader such as reader 112 and stores the received data in database 506. The data received from reader 112 includes data logs from each of secure elements in the secure network. Database 506 may further store one or more reference network signatures. A reference net work signature includes the expected network configuration of the secure elements over a period of time. Thus, a reference network signature may include one or more snapshots of the expected network configuration at points in time. The reference network signature for a secure network may be programmed using a priori knowledge of secure elements which should comprise secure active network 100 and the allowed geographic operation zones for one or more of the secure elements.

The secure element may be part of a stationary network (the secure elements do not move). However, in embodiments of the disclosure, secure element may be movable (such as during shipment). When secure elements are movable (and expected to be shipped), the reference network may specify different location ranges at different communication session times indicating a route of travel for the secure element.

Processor 504 is configured to identify whether one or more secure elements were tampered with over a predefined period of time. Processor 504 may identify conditions indicative of tampering at the network level and/or the individual secure element level. When analyzing at the network level, processor 504 is configured to reconstruct the actual network configuration of the secure network at various point in time using the received data logs. The actual (reconstructed) network configuration includes an identification of the secure elements in the network and the communications pairs within the network. Reconstructed network A depicted in FIG. 5A is a graphical representation of the configuration of network A at time t0. Processor 504 is then configured to compare the expected network configuration to the reconstructed network configuration to identify any deviations.

When analyzing at the secure element level, processor 504 is configured to compare the actual data logs from a secure element or group of secure elements to the expected logs for the secure element or group of secure elements. During the comparison, processor 504 may interpret the results to determine whether difference indicates a compromised secure element or simply a secure element experiencing communications errors.

Processor 504 may prioritize the difference/deviation identified. In accordance with an exemplary embodiment of the disclosure, processor 504 may assign a lower priority to identified difference if it is more likely than not that the difference is a communications error and not a security breach. Similarly, processor 504 may assign a higher priority if the location data indicates that one or more secure elements were removed from the allowed location zone for a period of time.

In accordance with an embodiment of the present disclosure, processor 504 may take different steps depending on the priority level of the compromise. Processor 504 may issue an alarm command if a level one priority compromise has been detected, and issue a warning and/or notification command if a level two priority compromise has been detected.

Figure 5B:
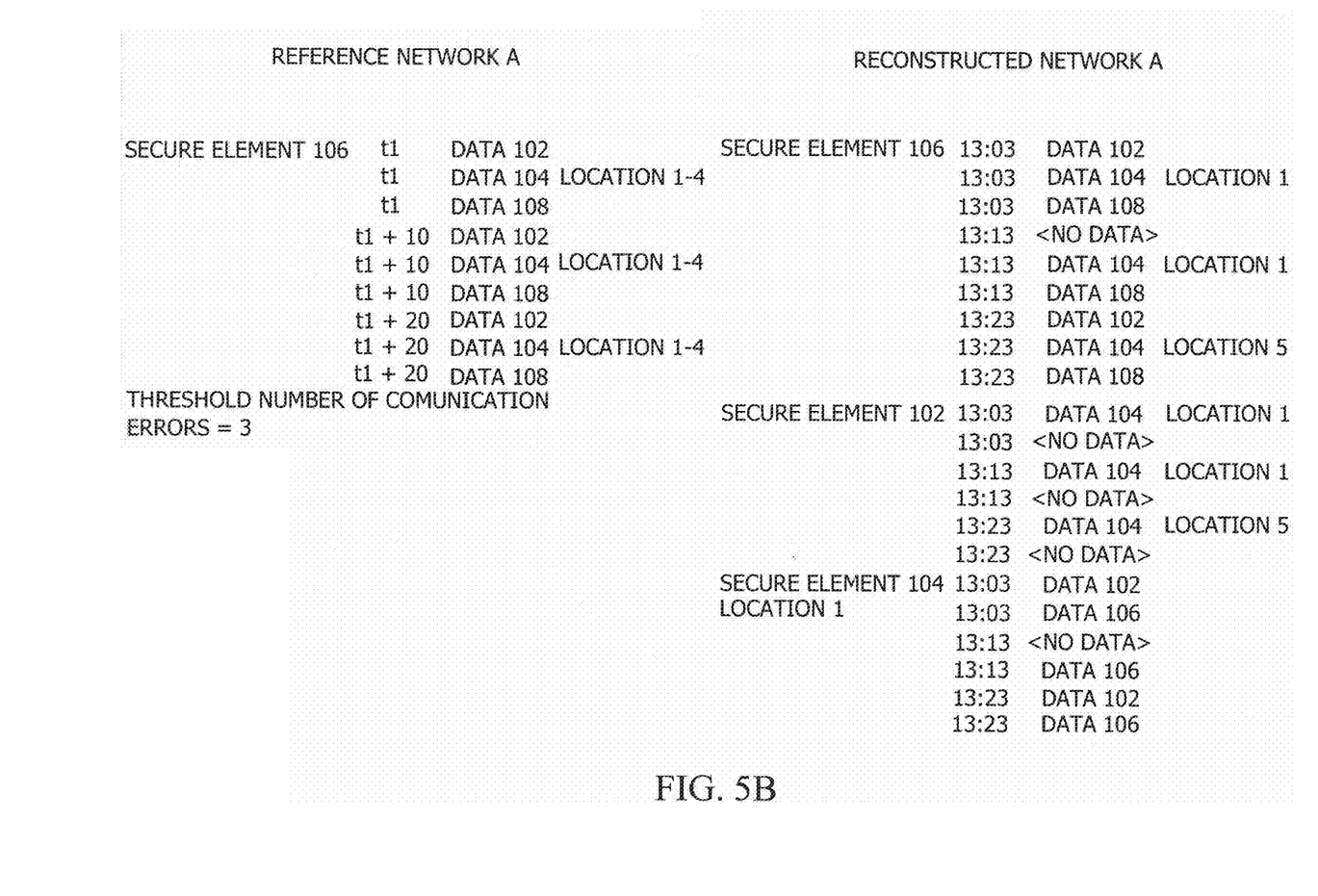
FIG. 5B illustrates a network verification system secure element data log analysis according to an exemplary embodiment of the disclosure.

FIG. 5B illustrates an exemplary reference network signature 580 and reconstructed (actual) network signature 590, according to an exemplary embodiment of the disclosure. In this example, network A is expected to include four secure elements with the following network configuration:

102 ↔ 104
102 ↔ 106
104 ↔ 106
106 ↔ 108

The reference network signature includes the complete data logs for each of the four secure elements.

Reference network A includes parameters such as communications session timing, which is shown as occurring every 10 minute intervals after an initial communication time t0. In the secure network, only secure element 104 includes a location tracking module. Reference network A includes an indication of allowed locations for secure element 104 at each logged time interval. In this example, the location profile data is a range of zones.

Reconstructed network A provides the actual network configuration of the secure network over a period of time. The reconstructed network may include logs for each of the same elements. At a network level, reconstructed log indicates that the secure network included four elements and four separate communication pairs. The reconstructed network also shows communications at three different times. The reconstructed network signature is therefore consistent with the expected network signature.

When viewed at the secure element level, several deviations from the expected behavior of the secure elements are evident. For the data log corresponding to secure element 106, reconstructed network A indicates that, at 13:13, secure element 106 was unable to communicate with secure element 102. Secure element log 106 also indicates that the location data received from secure element 104 at 13:23 is outside the allowed location range for secure element 104. For the data log corresponding to secure element 102, reconstructed network A indicates that the secure element failed to communicate with secure element 106 at all three communications times. The data log of secure element 102 also indicates an out-of-range condition for secure element 104 at 13:23. For the data log corresponding to secure element 104, reconstructed network A indicates that secure element 104 was not in communication with secure element 102 at 13:13. The logs for both secure element 106 and 104 indicate failed communication with secure element 102 at the same time.

Figure 6:
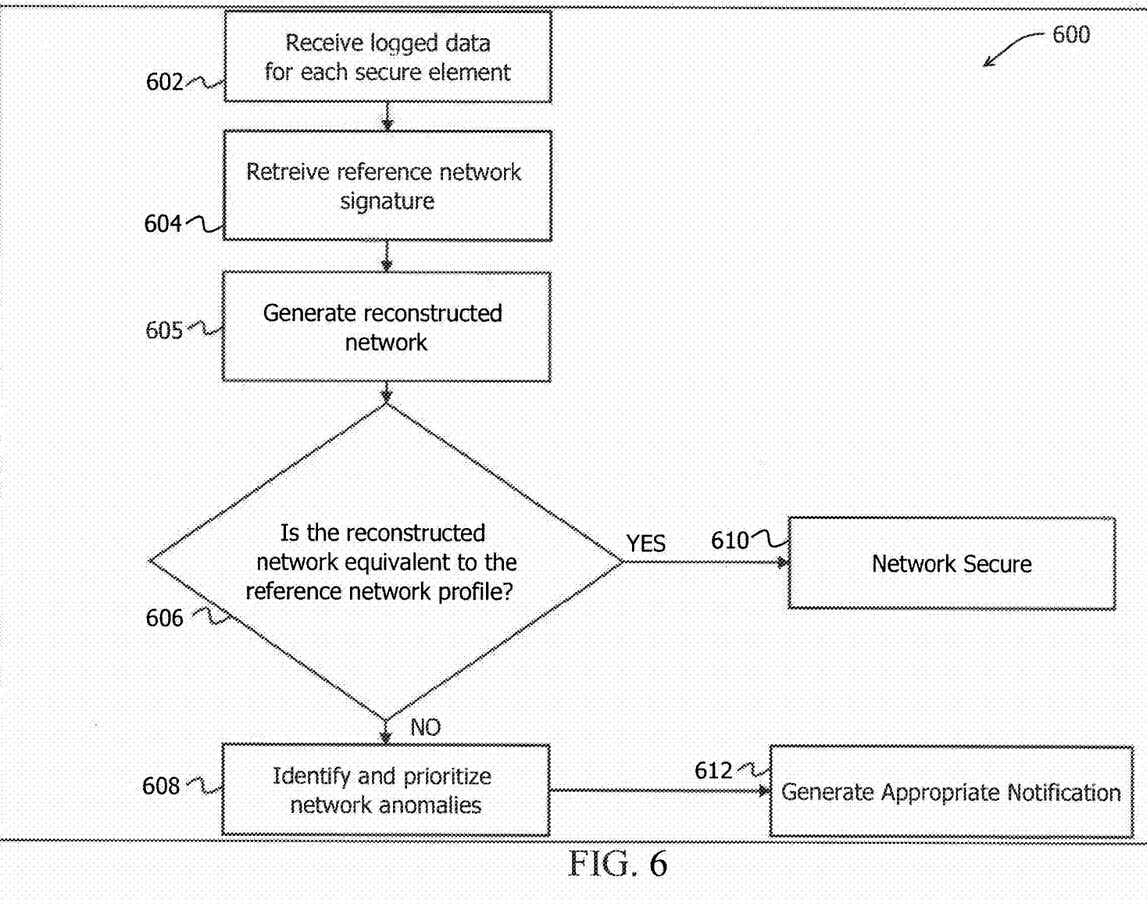
FIG. 6 is a flowchart illustrating a network verification system procedure according to an exemplary embodiment of the disclosure.

FIG. 6 is a flowchart 600 of a method for network verification according to an exemplary embodiment of the disclosure. FIG. 6 is described with continued reference to the embodiments depicted in FIGS. 1-3 and 5A. However, flowchart 600 is not limited to those embodiments.

In step 602, network verification system receives logged data for each of the secure elements in the secure network. In an embodiment, network verification system receives the logged data from a reader, such as reader 112. In an alternate embodiment, network verification system receives the logged data from the secure elements.

In step 604, the processor of the network verification system accesses database 506 to retrieve a reference network signature for each of the secure elements. Processor 504 determines the expected communication partners, associated network parameters and an expected location profile for each of the secure elements, using the reference network signature.

In step 605, the processor of the network verification system analyzes the logged data to generate a reconstructed network. The reconstructed network includes a recreation of the network using the data provided in the data log which indicates the history of communications, locations, and/or any communication errors between each of the secure elements and its communications partners.

In step 606, the processor of the network verification system compares the reconstructed network to the reference network. The processor compares the received data logs for each secure element to the expected logs which are provided by the reference network corresponding to each secure element. The processor determines any anomalous secure elements by verifying communications between each secure element and its communication partners according to each reference network. The processor further determines any anomalous secure elements by comparing the location profile data in each of the reference networks to the location data included in the received data logs.

In step 608, the processor of the network verification system determines that the reconstructed network is not equivalent to the reference network. For example, the processor may determine from the logged data, that communication was lost between a secure element and more than one of its communication partners. The processor may determine that communication errors between from a single secure element exceeds a threshold number of errors as provided in that corresponding secure elements reference network signature. To provide another example, the processor may determine that location data from a secure element data log deviates from the location data range and/or location data profile corresponding to that corresponding secure elements reference network signature. The processor identifies and prioritizes any anomalous secure elements based on the type of anomaly.

In step 610, the processor of the network verification system determines that reconstructed network 512 is equivalent to reference network 510. The processor may determine no anomalies in any of the secure elements, or that the received data logs comply with any communication error thresholds and location ranges as indicated in the reference networks In step 612, the processor issues a notification and/or alarm command indicating an anomalous status for each secure element according to the priority level determined in step 608.

Figure 7:
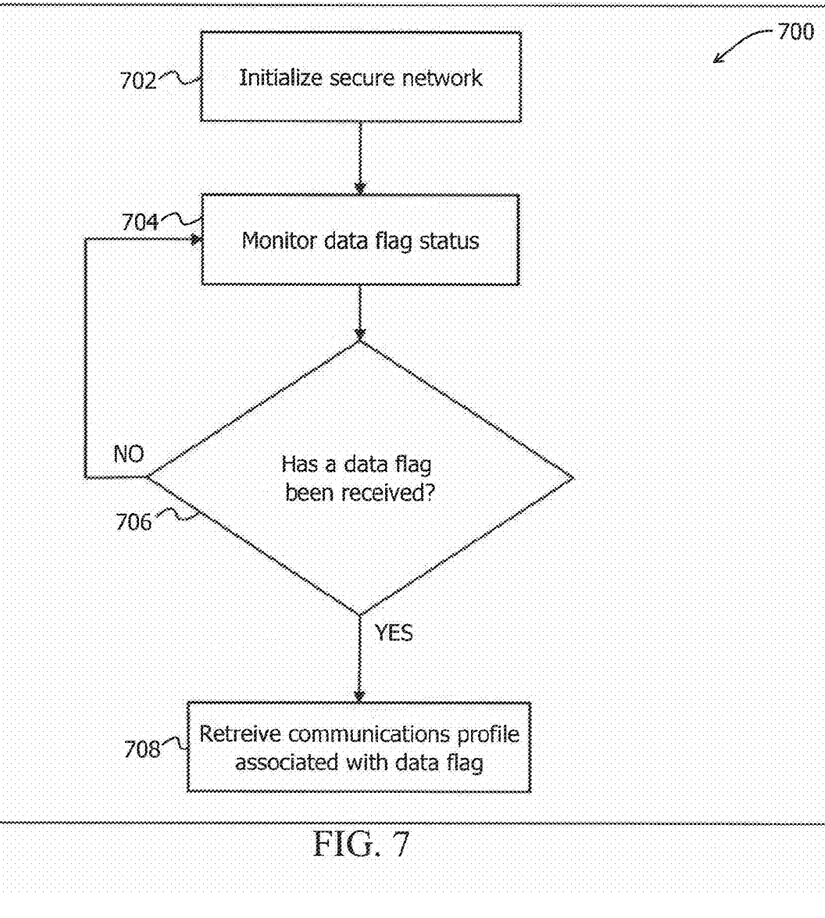
FIG. 7 is a flowchart illustrating a dynamic network operation according to an exemplary embodiment of the disclosure.

FIG. 7 is a flowchart 700 of a method for dynamic network operation according to an exemplary embodiment of the disclosure. FIG. 7 is described with continued reference to the embodiments depicted in FIGS. 1-3 and 5. However, flowchart 700 is not limited to those embodiments.

In step 702, each secure element determines its communication partners that are within communications range. Thereafter, processor 202 instructs secure element communications module 204 to initiate communications with the identified secure elements according to a communications schedule.

In step 704, each secure element communicates with one or more of its communications partners to exchange and log data, according to the initial schedule and protocol established in step 702. Each secure element monitors data flags received from its communication partners which may be indicative of anomalies detected by other secure elements.

In step 706, verification module 212 of the secure element determines whether a data flag has been received. If a data flag has not been received, control flow passes back to step 704, and the secure element continues to monitor data received from its communication partners for data flags. If verification module 212 determines that a data flag has been received, then verification module 212 retrieves the corresponding communication profile settings from memory 206 corresponding to the particular data flag.

In step 708, the verification module commands appropriate components within its corresponding secure element to communicate with its communications partners and/or a reader according to the communications profile settings. The components controlled by verification module 212 depends on the type of anomaly. For example, if a data flag is indicative of a location-based of anomaly, then verification module 212 may instruct secure processor 214 to strengthen encryption and/or change an encryption key. To provide another example, if a data flag is indicative of a communications-based triggering event, then verifications module 212 may instruct secure element communications module 204 and/or reader communications module 216 to change communications protocols. In this way, the communications protocols between each secure element and its communication partners and/or a reader may be tailored to the type of anomaly.

Figure 8:
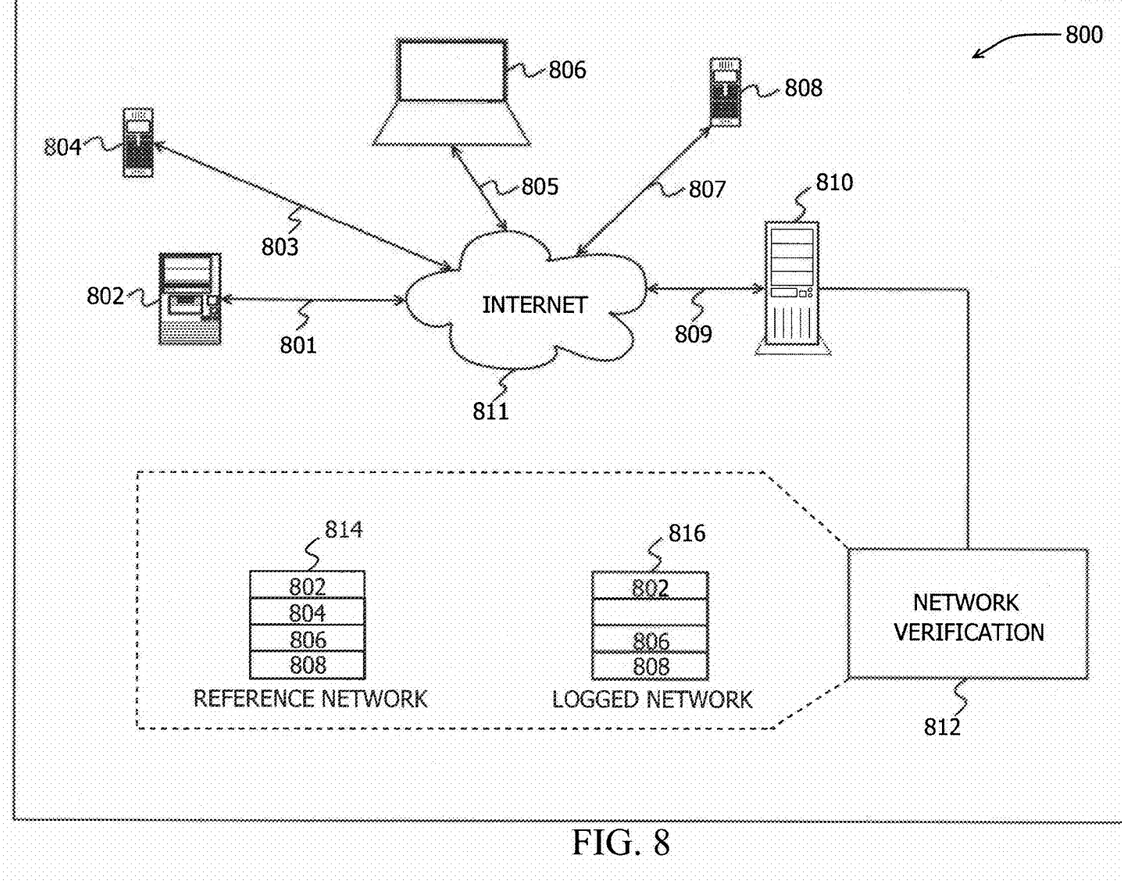
FIG. 8 illustrates a multi-user secure active network system in accordance with an embodiment of the disclosure.

FIG. 8 illustrates a multi-user secure active network system in accordance with an embodiment of the disclosure. Remote secure active network 800 includes smartphones 804 and 808, personal computer (PC) 802, laptop 806, server 810, and network verification system 812. Each of smartphones 804 and 808, the PC 802, and laptop 806 may include physical, virtual, and/or logical secure elements.

In embodiments of the present disclosure, smartphones 804 and 808, PC 802, and laptop 806 may each include a secure element, such as secure element 102, integrated as a part of each respective device. In further embodiments of the present disclosure, the secure elements are software elements, integrated within the operating system of each respective device, installed as an application ("app"), which are run from each respective device. In yet another embodiment of the present disclosure, the secure elements are logical secure elements running within a trusted execution environment (TEE) on each respective device. Smartphones 804 and 808, PC 802, and laptop 806 may include any number and/or combinations of physical, virtual, and/or logical secure elements.

Smartphones 804 and 808, PC 802, and laptop 806 each connect to the internet 811 through communication links 803, 807, 801, and 805, respectively. Communication links 801, 803, 805, and 807 may be any combination of wired and/or wireless connections, such as cellular, Wi-Fi, and/or land line connections, for example. Server 810 is connected to the internet 811 via communication link 809. Smartphones 804 and 808, PC 802, and laptop 806 communicate with one another through the internet 811 by utilizing a website, program, or application running from the server 809. Smartphones 804 and 808, PC 802, and laptop 806 form a network based on their common connection to the server 810 and communicate and exchange data with one another. For example, smartphones 804 and 808, PC 802, and laptop 806 communicate with one another using an instant messaging (IM) service and/or a social networking application.

Smartphones 804 and 808, PC 802, and the laptop 806 communicate and send data to server 810 according to a predetermined schedule. The data may include unique identification data, such as internet protocol (IP) addresses, serial numbers, and/or location data representative of the physical location of each respective device. The secure element within each of smartphones 804 and 808, PC 802, and laptop 806 sends the data to the all of the devices connected to remote secure active network 800.

In an embodiment of the present disclosure, each of smartphones 804 and 808, PC 802, and laptop 806 sends the data to server 810 in continuous intervals, and the secure element within each of smartphones 804 and 808, PC 802, and laptop 806 communicates with server 810 to access the data. In this way, smartphones 804 and 808, PC 802, and laptop 806 do not need to maintain a log of data transmitted by every other device, as server 810 performs this functionality. The secure element within each of smartphones 804 and 808, PC 802, and laptop 806 each sends the data to server 810 periodically and/or whenever one of smartphones 804 and 808, PC 802, and laptop 806 is in use.

Server 810 is configured to run network verification system 812, which may be implemented as a program, for example, that monitors the data sent by smartphones 804 and 808, the PC 802, and laptop 806. Server 810 logs the data as logged network 816, and compares logged network 816 to a reference network 814. Reference network 814 is a network which includes all members of the network which are expected to be in active communication with sever 810. Network verification system 812 determines whether smartphones 804 and 808, PC 802, and laptop 806 are actively communicating with server 810 at any time by comparing logged network 816 to reference network 814.

In embodiments of the present disclosure, server 810 is configured to send notifications to smartphones 804 and 808, PC 802, and laptop 806 when a determination has been made that any of smartphones 804 and 808, PC 802, and laptop 806 are no longer active on remote secure active network 800. The notification may include the last logged location data for the device that is no longer in communication with server 810, as well as a warning that a particular user has been out of communication with server 810.

In further embodiments of the present disclosure, network verification system 812 is configured to make a determination that a user is no longer active on remote secure active network system 800 if data is not received from smartphones 804 and 808, PC 802, and laptop 806 within a threshold time set by a communications schedule. For example, each of secure elements within smartphones 804 and 808, PC 802, and laptop 806 may be configured to send data to server 810 every 10 minutes. If network verification system 812 determines after this threshold time is exceeded that smartphone 804 has not sent data to server 810, then logged network 816 indicates that smartphone 804 is no longer active on the network, and notifications are sent to smartphone 808, PC 802, and laptop 806 accordingly.

Network verification system 812 may be configured to make a determination that a user is no longer active on remote secure active network system 800 if too much time expires after the most recently logged activity. For example, the secure elements within smartphones 804 and 808, PC 802, and laptop 806 may continuously send data to server 810 when each respective device is being used. For example, PC 802 may send data to server 810 when a keyboard connected to PC 802 is being used for typing, and otherwise not send the data. A threshold time may be set to 12 hours, for example, such that no activity for 12 hours after previously using the keyboard would notify smartphones 804 and 808, PC 802, and laptop 806 that PC 802 is no longer in communication with server 810.

Network verification system 812 may log user activity of each of smartphones 804 and 808, PC 802, and laptop 806 and build a user profile. The user profile for smartphones 804 and 808, PC 802, and laptop 806 reflects user activity for each respective device according to the time of day and/or day of the week, for example. By comparing the data sent to server 810 with the user profile for each respective device, network verification system 812 may send a notification to the devices connected to server 810 if the corresponding user does not operate the respective device before a time correlated with the user activity profile expires.

For example, the user profile for a user of smartphone 804 could indicate that the smartphone 804 is used every Wednesday night from 6 p.m. to 7 p.m. Regardless of any communications schedule, network verification system 812 may determine that the user is no longer in communication with server 810 if this time period elapses without any data sent by smartphone 804, and notify smartphone 808, laptop 806, and PC 802 accordingly.

Although the description of the present disclosure is described in terms of physical devices attached to an active secure network, those skilled in the relevant art(s) will recognize that the present disclosure may be applicable to other devices that are capable of being identified, monitored, and/or tracked using any unique identification without departing from the spirit and scope of the present disclosure. For example, although the present disclosure is described using physical devices connected to the secure active network, those skilled in the relevant art(s) will recognize that virtual devices or databases may be a part of the secure active network without departing from the spirit and scope of the present disclosure.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail may be made therein without departing from the spirit and scope of the disclosure. Thus the disclosure should not be limited by any of the above-described exemplary embodiments, but should be defined only in accordance with the following claims and their equivalents.

Embodiments of the invention may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals, etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

What is claimed is:

1. A secure network element, comprising:
   a communications module configured to receive location data, indicating a location of a second secure network element, according to a first communications protocol at scheduled communication sessions; and
   a processor configured to:
      compare the location data to a reference location data range at the scheduled communication sessions,
      change an encryption in response to determining that the location data deviates from the reference location data range, and
      change the first communications protocol to a second communications protocol in response to determining that communications have been lost between the secure network element and the second secure network element.

2. The secure network element of claim 1, wherein the communications module is further configured to attempt to exchange data with the second secure network element, the data being indicative of an identification of the secure network element and the second secure network element, according to the first communications protocol.

3. The secure network element of claim 2, wherein the processor is further configured to change the first communications protocol to the second communications protocol if a number of failed data exchanges exceeds a threshold number.

4. The secure network element of claim 1, wherein the communications module is further configured to:
   encrypt data sent to the second secure network element in accordance with a first encryption as part of the first communications protocol, and
   encrypt data sent to the second secure network in accordance with a second encryption as part of the second communications protocol.

5. The secure network element of claim 1, wherein the first communications protocol includes wireless communication according to a first frequency, and wherein the second communications protocol includes wireless communication according to a second frequency.

6. The secure network element of claim 2, further comprising:
   a memory configured to store data received from the second secure network element as logged data, wherein the logged data includes a timestamp corresponding to each of the communication sessions and an indication of whether data was received from the second secure network element.

7. The secure network element of claim 2, wherein the secure network element is coupled to a device, the secure network element further comprising:
   a memory for storing an encrypted serial number of the device as the identification of the secure network element.

8. In a secure network element, a method comprising:
   attempting to exchange location data with a second secure network element according to a communication protocol;
   determining expected location data for the second secure network element;
   generating a data log based on the location data, the data log comprising:
      a plurality of timestamps corresponding to the communications protocol, and
      a plurality of indications, for respective timestamps in the plurality of timestamps, regarding whether the data was received from the second secure network element;
   changing an encryption key in response to determining, based on the location data log, that the location data from the second secure network element deviates from the expected location data; and
   changing the communication protocol in response to determining that communications have been lost between the secure network element and the second secure network element.

9. The method of claim 8, further comprising:
   changing the communication protocol if the location data received from the second secure network element indicates that the second secure network element traveled outside a predetermined zone.

10. The method of claim 8, further comprising:
sending a data flag to the second secure network element if the data log indicates that a total number of instances the data was not received is above a threshold number.

11. The method of claim 8, further comprising:
changing the communications protocol upon receipt of a data flag sent by the second secure network element.

12. A method for dynamic network operation, the method comprising:
determining a communication partner of a secure network element that is within a communication range of the secure network element;
determining expected location data for the communication partner;
creating a data log based on location data exchanged with the communication partner;
changing an encryption key in response to determining, based or the data log, that the location data from the communication partner deviates from the expected location data; and
changing a communication protocol in response to determining, based on the data log, that communications have been lost between the secure network element and the communication partner.

13. The method of claim 12, further comprising:
monitoring data flags received from the communication partner.

14. The method of claim 12, further comprising:
receiving a data flag from the communication partner; and
determining a type of communication anomaly based on the data flag.

15. The method of claim 12, further comprising:
retrieving communication profile settings corresponding to the data flag in response to determining that a data flag was received from the communication partner.

16. The method of claim 12, further comprising:
setting a low priority data flag in response to determining that communications have been lost between the secure network element and the communication partner; and
setting a high priority data flag in response to determining that the location data from the communication partner deviates from the expected location data.

17. The method of claim 12, further comprising:
determining whether a number of communication errors received from the network partner exceeds a threshold number of errors in a reference network signature of the communication partner.

18. The method of claim 12, further comprising:
determining, based on a comparison between the data log and an expected data log, whether the communication partner has been compromised.

19. The method of claim 12, wherein the data log further comprises expected location data for a plurality of communication partners, and wherein the method further comprises:
generating a reconstructed network of the plurality of communication partners based on the data log.

20. The method of claim 19, further comprising:
comparing the reconstructed network with reference network signatures of the plurality of communication partners; and
determining, based on comparing the reconstructed network with the reference network signatures, whether the plurality of communication partners comprises an anomalous communication partner.

\* \* \* \* \*